United States Patent [19]

Stephens

[11] Patent Number: 4,907,019

[45] Date of Patent: Mar. 6, 1990

[54] INK JET CARTRIDGES AND INK CARTRIDGE MOUNTING SYSTEM

[75] Inventor: Rodney M. Stephens, Hillsboro, Oreg.

[73] Assignee: Tektronix, Inc., Beaverton, Oreg.

[21] Appl. No.: 329,055

[22] Filed: Mar. 27, 1989

[51] Int. Cl.[4] ............................ G01D 15/6; B41J 3/04

[52] U.S. Cl. ................................ 346/140 R; 141/367; 355/260

[58] Field of Search ................ 346/140; 355/260, 327; 141/367, 311 R, 329

[56] References Cited

U.S. PATENT DOCUMENTS 4,611,899 9/1986 Kasamura .......................... 355/260

4,737,801 4/1988 Ichihashi ............................ 346/140

*Primary Examiner*—Joseph W. Hartary

*Attorney, Agent, or Firm*—David P. Petersen; Robert S. Hulse

[57] ABSTRACT

An improved ink cartridge mounting system for a primary ink jet printer including an ink cartridge mounting element having four cartridge receiving openings, each specially configured to receive an ink cartridge containing ink of a particular color. A unique arrangement of six ribs extends from the outer periphery of each cartridge receiving opening to define a distinctive keying pattern adapted to seat an ink cartridge having a fluted end portion configured to mate with the distinctive keying pattern. The unique keying pattern designated for each different color are entirely complementary to a prior keying pattern employed for the same color in an alternate type of ink jet printer but for the provision of at least one additional rib. Thus, a cyan ink cartridge, for example, has a fluted end portion so configured to mate precisely with the cyan cartridge receiving opening of both the primary and alternative ink jet printers, while a cyan ink cartridge having a fluted end portion so configured to mate precisely with the cyan cartridge opening of the alternate ink jet printer will not seat in any opening of the primary ink jet printer.

10 Claims, 7 Drawing Sheets

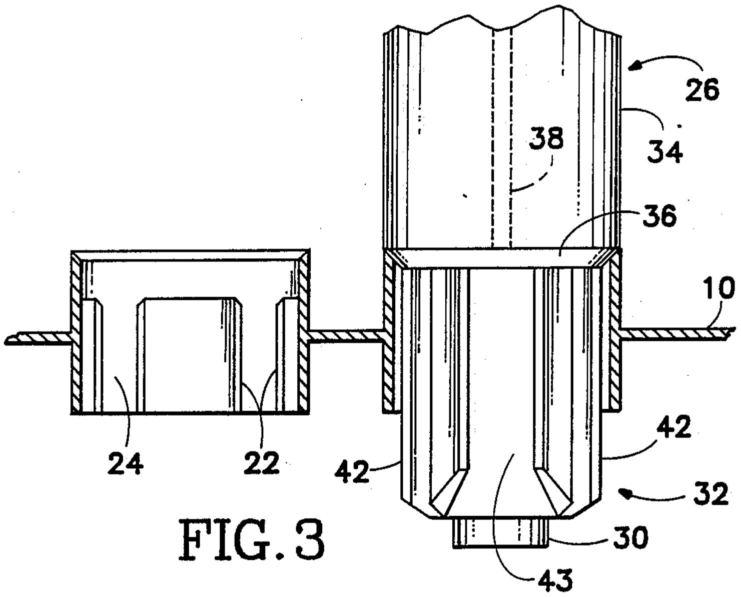
FIG. 3
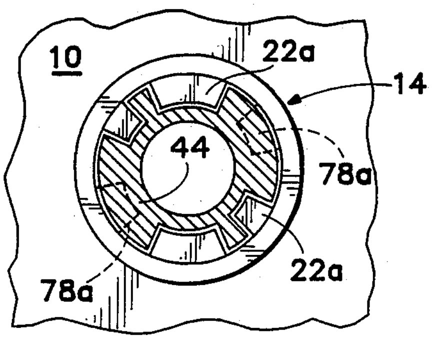
FIG. 7 YELLOW

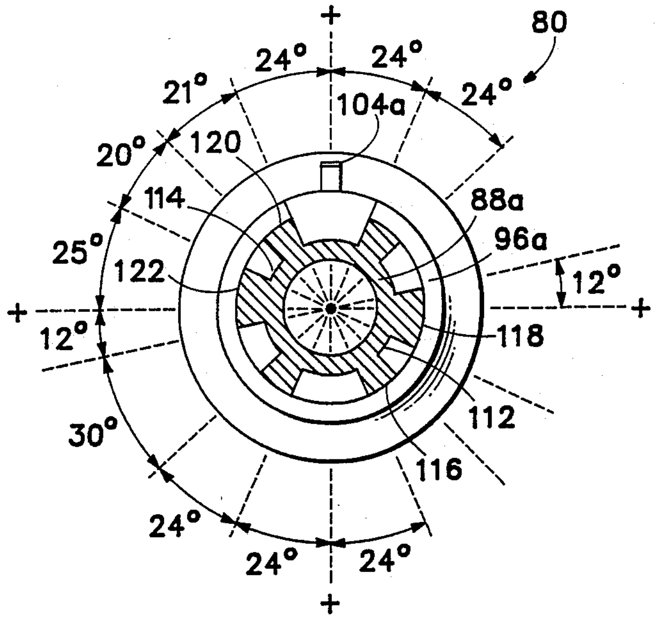
FIG. 6a YELLOW
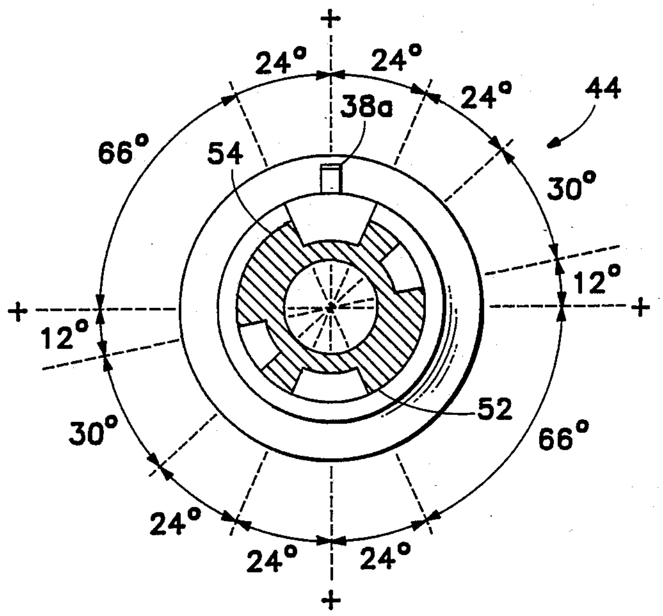
FIG. 4a YELLOW
(PRIOR ART)

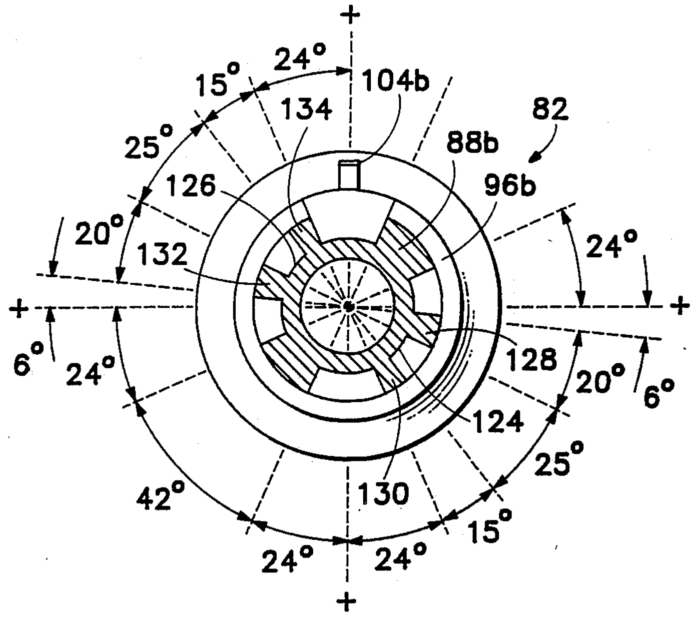
FIG. 6b MAGENTA
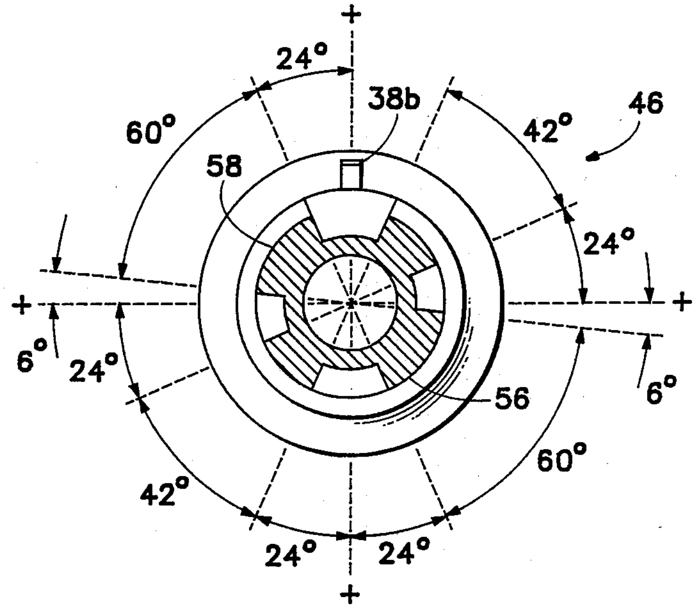
FIG. 4b MAGENTA
(PRIOR ART)

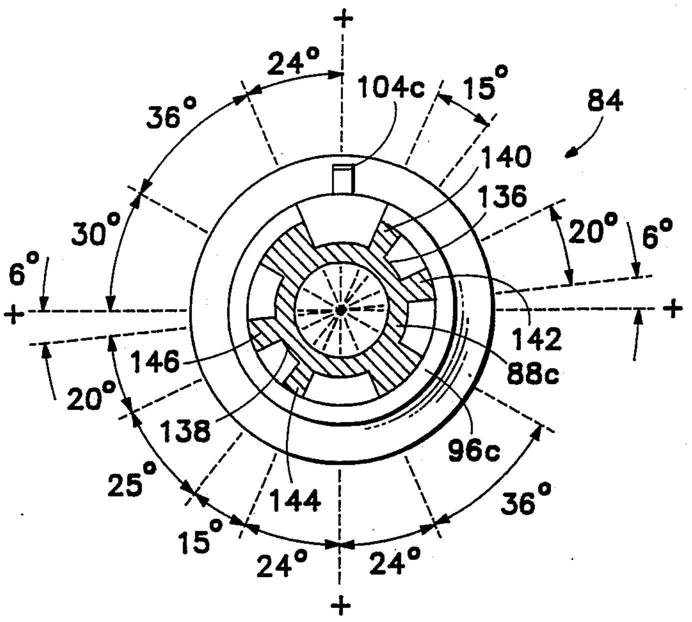
FIG. 6c CYAN
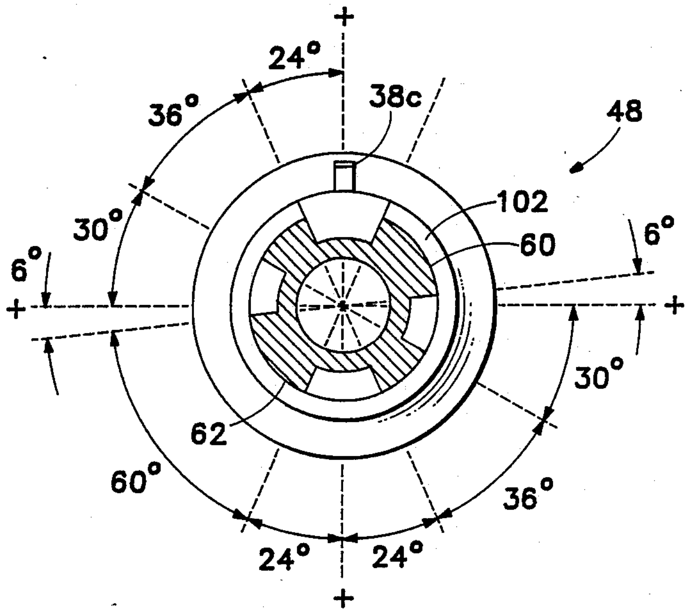
FIG. 4c CYAN
(PRIOR ART)

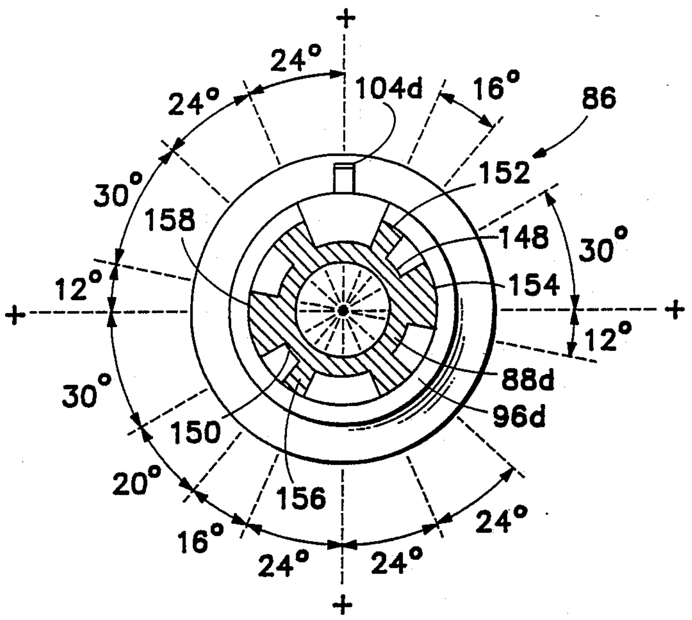
FIG. 6d BLACK
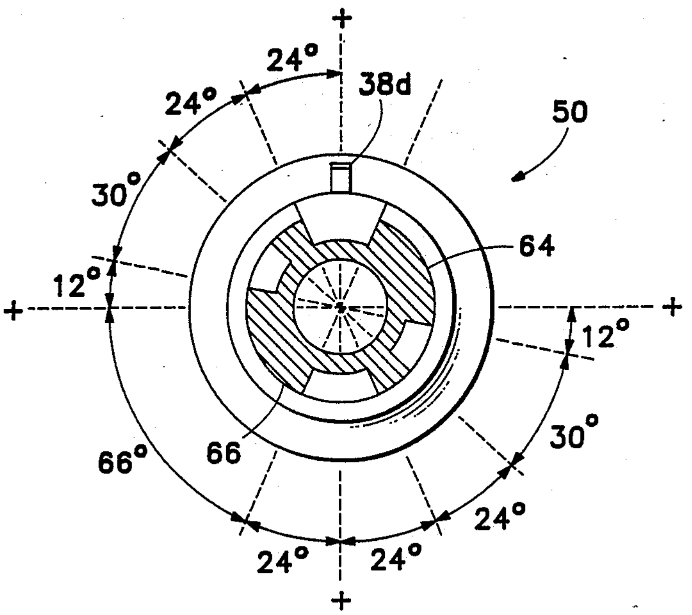
FIG. 4d BLACK
(PRIOR ART)

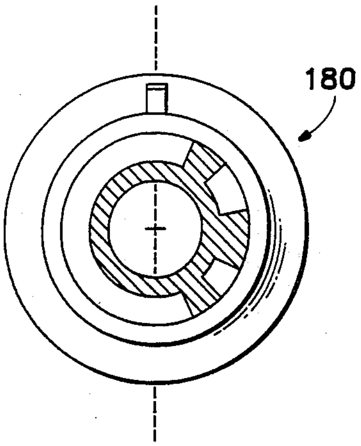
FIG. 8a YELLOW
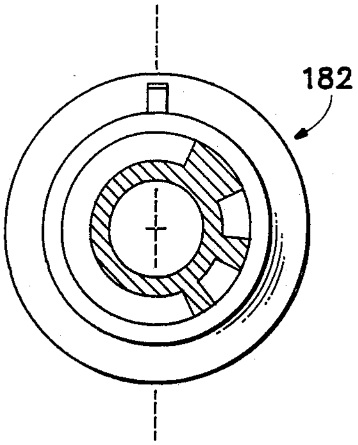
FIG. 8b MAGENTA
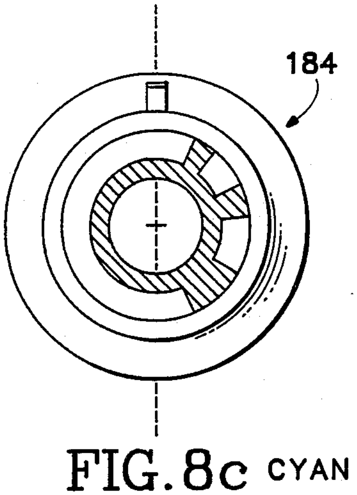
FIG. 8c CYAN
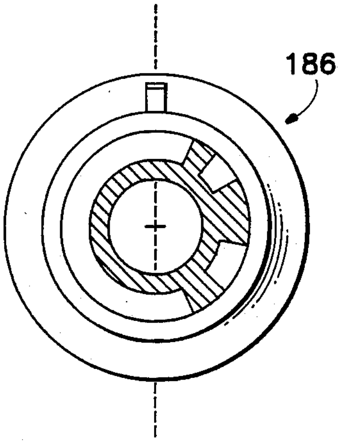
FIG. 8d BLACK

INK JET CARTRIDGES AND INK CARTRIDGE MOUNTING SYSTEM

TECHNICAL FIELD

This invention relates to ink jet printers, and in particular to ink cartridges and a mounting system for ink cartridges used in such printers.

BACKGROUND OF THE INVENTION

Ink jet printers having one or more ink jet heads for projecting drops of ink onto paper or other printing media to generate graphic images and text have become increasingly popular. To form color images, ink jet printers with multiple ink jet printing heads are used, with each head being supplied with ink of a different color. These colors are then applied, either alone or in combination, to the printing medium to make a finished color print. Typically, all of the colors needed to make the print are produced from combinations of cyan, magenta and yellow ink. In addition, black ink may be utilized for printing textual material or for producing true four-color prints.

In a common arrangement, the print medium is attached to a rotating drum, with the ink jet heads being mounted on a traveling carriage that traverses the drum axially. As the heads scan paths over the printing medium, ink drops are projected from a minute external orifice in each head to the medium so as to form an image on the medium. A suitable control system synchronizes the generation of ink drops with the rotating drum.

A prior ink jet head which operates in the general manner just described is disclosed in U.S. Pat. No. 4,613,875 to Le et al., assigned to Tektronix, Inc., Beaverton, Oreg.

Another prior ink jet head of the general type just described is used in the Model 4696 color graphics printer manufactured by Tektronix, Inc. The Model 4696 printer includes an ink cartridge mounting element having four cartridge openings, each of which defines a unique keyway pattern adapted to removably seat a substantially cylindrical ink cartridge having a mating fluted periphery at one end thereof. Each of the four ink colors used by the printer is contained in its own ink cartridge, with the cartridge for each particular color having a different arrangement of flanges and flutes adapted to fit the particular keyway pattern of the cartridge opening assigned to that color. Thus, the cartridge containing cyan ink, for example, can only be seated on the cartridge opening having a keyway pattern complementary to the cyan cartridge's unique flange and flute pattern. In this way, the four ink cartridges are properly indexed in the ink jet head in a foolproof manner.

Each ink cartridge opening is located above an ink reservoir which supplies ink of a particular color to an ink jet head. Thus, in a four cartridge system, there are four distinct ink reservoirs and four distinct ink jet heads. Some ink jet printers employ multiple ink cartridges, reservoirs and ink jet heads for each color. Each reservoir is provided with a hollow needle designed to pierce a mylar seal located at the bottom of the cartridge, thereby permitting ink to flow from the cartridge into the reservoir from there, typically on demand, to the ink jet head which applies the ink to the printing medium.

Despite the foregoing advancements in ink jet printer technology, as new models of cartridge-type ink jet printers are designed and new and improved ink formulations are discovered, there remains a need for a cartridge mounting system for ink jet printers which enables ink cartridges containing new ink formulations to be used universally in both new and compatible old ink jet printer models alike and yet precludes old style ink cartridges containing possibly inferior, less desirable or less versatile ink formulations from being used with the new ink jet printer model.

Therefore, a need exists for an improved ink cartridge and ink cartridge mounting system which is directed to overcoming this disadvantage.

SUMMARY OF THE INVENTION

A cartridge mounting system for an ink jet printer has a body and aperture means defining a plurality of ink cartridge receiving openings in the body, each of which is adapted to seat an ink cartridge containing ink of a particular color. Each cartridge receiving opening is provided with a plurality of spaced apart ribs projecting inwardly from a peripheral boundary of the opening toward the center of the opening, with a recess being formed between adjacent ribs. The ribs and recesses of each opening are so sized, configured and located as to create a unique keyway pattern for each different color, typically cyan, magenta, yellow or black. The ink cartridges have fluted end portions, the fluted end portions having outwardly projecting flanges separated by flutes which are configured and arranged to fittingly complement the keyway pattern of one color but not the others. The mating keyway pattern of one cartridge receiving opening and its associated cartridge for one particular color are complementary to the keyway pattern used for the same color in a prior ink jet printer model. In addition, an occlusion means is provided in each cartridge receiving opening which is complementary to the keying pattern of one of the ink cartridges of the present invention, but not complementary to the keying pattern of any old style ink cartridges adapted for use in alternate old style ink jet printers. Thus, ink cartridges having complementary keyway patterns to the new primary printer constructed in accordance with the present invention are also complementary to and usable in at least one prior alternate printer model, while cartridges specifically designed to be used on such alternate printer model are neither complementary to nor usable in the primary printer model.

In one form of the invention, the cartridge receiving openings and cartridges have keying patterns defined by an arrangement of six ribs (or flanges) and flutes. Such keying patterns are complementary to the four-fluted and four-ribbed keying patterns of at least one alternate ink jet printer, but have two additional ribs which render four-flanged cartridges unusable.

It is accordingly one object of the invention to provide an improved cartridge mounting system and ink cartridge for an ink jet printer which facilitates the use of one series of ink cartridges in both a new style ink jet printer and at least one alternate style ink jet printer, and yet precludes the use of a second series of cartridges designed for the alternate style printer in the new style printer.

Another object of the invention is to provide an improved cartridge mounting system for a new model of ink jet printer which facilitates the use of a first series ink cartridge in both the new model ink jet printer and Model 4696 ink jet printer, and yet precludes the use of a second series of Model 4696 style cartridges in the new ink jet printer model.

Yet another object of the invention is to provide an improved system, as aforesaid, which also is economical to manufacture.

These and other objects, advantages and features of the present invention will become apparent with reference to the following detailed description and drawings.

BRIEF DESCRIPTION OF THE DRAWINGS

FIG. 3 is an enlarged vertical partially sectional view of a portion of an ink cartridge receiving portion, with one cartridge seated thereon.

FIG. 4*a* is an enlarged sectional view similar to that of line 3—3 of FIG. 2 of a prior art ink cartridge for the color yellow.

FIG. 4*b* is an enlarged sectional view similar to that of FIG. 4*a* of a prior art ink cartridge for the color magenta.

FIG. 4*c* is an enlarged sectional view similar to that of FIG. 4*a* of a prior art ink cartridge for the color cyan.

FIG. 4*d* is an enlarged sectional view similar to that of FIG. 4*a* of a prior art ink cartridge for the color black.

FIG. 6*a* is an enlarged sectional view similar to that of FIG. 4*a* of an ink cartridge for the color yellow in accordance with the present invention.

FIG. 6*b* is an enlarged sectional view similar to that of FIG. 4*b* of an ink cartridge for the color magenta in accordance with the present invention.

FIG. 6*c* is an enlarged sectional view similar to that of FIG. 4*c* of an ink cartridge for the color cyan in accordance with the present invention.

FIG. 6*d* is an enlarged sectional view similar to that of FIG. 4*d* of an ink cartridge for the color black in accordance with the present invention.

FIG. 7 is an enlarged illustrative sectional view showing the prior art yellow cartridge of FIG. 4*a* seated in the complementary cartridge receiving opening "Y" of FIG. 1, and showing in dashed lines the respective locations of the additional ribs of the cartridge receiving opening "Y" of FIG. 5.

FIGS. 8*a*, 8*b*, 8*c* and 8*d* are alternate embodiments of ink cartridges corresponding to the colors yellow, magenta, cyan and black, respectively.

DETAILED DESCRIPTION OF A PREFERRED EMBODIMENT

Figure 1:
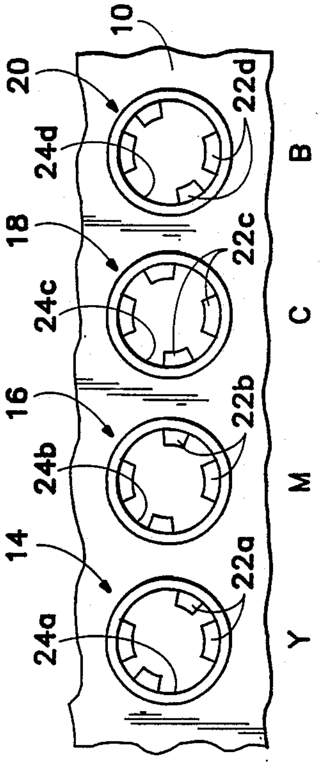
FIG. 1 (PRIOR ART)
FIG. 1 is a top fragmentary plan view of an ink cartridge receiving portion of a first prior art type ink jet printer.

FIG. 1 shows a prior art cartridge mounting element 10 of the type used in the Model 4696 ink jet printer manufactured by Tektronix, Inc., Beaverton, Oreg. Element 10 has four ink cartridge receiving openings 14, 16, 18, 20, each of which overlies an ink jet head (not shown). Each cartridge receiving opening 14, 16, 18, 20 serves to receive or seat a cartridge containing ink of a different color, typically, yellow, magenta, cyan or black.

Each cartridge receiving opening has four flanges or ribs 22*a*, 22*b*, 22*c*, or 22*d* which project inwardly from the opening's peripheral boundary toward the opening's center and define a plurality of recesses 24*a*, 24*b*, 24*c*, or 24*d* between the ribs. The flanges and recesses of each cartridge receiving opening define a keying pattern. While the four openings all have the same effective diameter, the flanges and recesses of each opening are so sized, configured and positioned about the peripheral boundary as to create four distinctive keying patterns.

Figure 2:
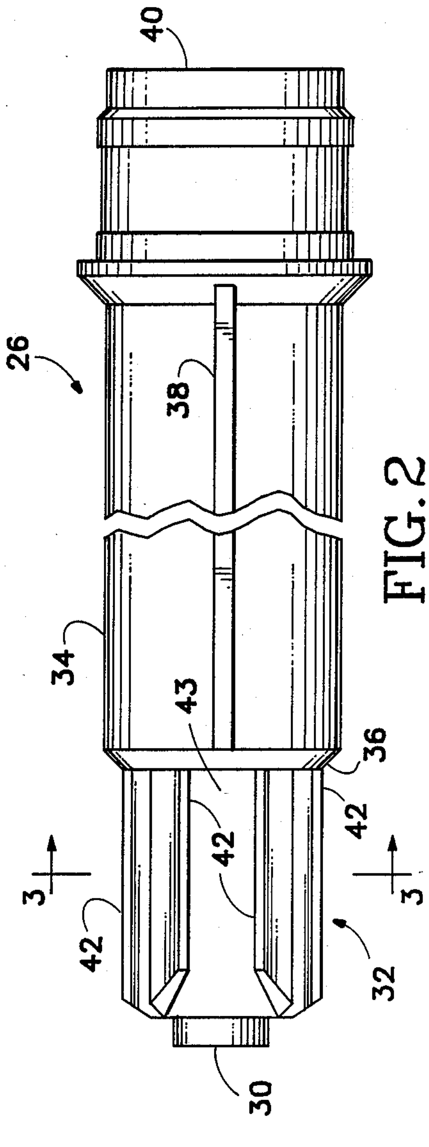
FIG. 2 is an enlarged side elevational view of an ink cartridge.

Each cartridge receiving opening seats or receives an ink cartridge 26 of the type shown in FIGS. 2 and 3. Cartridge 26, which is substantially cylindrical, is comprised of a hollow body having a first sealed end 30 of smallest diameter, fluted end portion 32 of slightly larger diameter, ink containing chamber or reservoir 34 of even larger diameter, shoulder 36 located between end portion 32 and chamber 34, indexing flange 38, and second sealed end 40 (FIG. 2). Ends 30 and 40 are each sealed with a thin mylar film for storage. Both sealed ends are pierced in a conventional manner prior to actual use in the ink jet printer, thereby permitting air to flow into the second end and ink to flow out of the first end.

Fluted end portion 32 has a plurality of radially extending ribs or flanges 42 which are sized, configured and positioned about its peripheral boundary so as to mate with the particular keying pattern of one of the cartridge receiving openings. Flutes or recesses 43 are formed between adjacent outwardly projecting flanges. As shown in FIG. 3, cartridge 26 is received or seated in an upright position by its mating cartridge receiving opening, with end 30 and fluted end portion 32 extending into and below the opening and shoulder 36 resting on element 10. It will be appreciated that the effective diameter of fluted end portion 32 is slightly less than the effective diameter of the cartridge receiving opening and that flanges 42 project nestingly into the recesses 24 of the cartridge receiving opening. Similarly, the ribs 22 of the cartridge receiving opening project nestingly into flutes 43 of the cartridge. As so supported, the upright cartridge acts as an ink reservoir which allows ink to be drawn downwardly through end 30.

Indexing flange 38 extends longitudinally along the outer surface of chamber 34 and serves as an indexing feature to facilitate easy loading of a replacement ink cartridge in its appropriate cartridge receiving opening. With the rib indexed in the twelve o'clock or six o'clock positions, the cartridge may be properly seated in the proper cartridge receiving opening.

The foregoing generally described ink cartridge construction is conventional.

With reference to FIGS. 4*a*, 4*b*, 4*c* and 4*d*, the keying patterns of the conventional ink cartridges adapted to be seated in the cartridge receiving openings of FIG. 1 will now be described. Cartridges 44, 46, 48 and 50 each have a four-fluted end portion specially configured to mate perfectly with one of the cartridge receiving openings of FIG. 1. Thus, yellow ink cartridge 44 (FIG. 4*a*) seats in opening 14, magenta ink cartridge 46 (FIG. 4*b*) in opening 16, cyan ink cartridge 48 in opening 18, and black ink cartridge 50 in opening 20. Each cartridge loaded with a particular color of ink seats only in the cartridge receiving opening assigned for that color.

More specifically, each cartridge 44, 46, 48, 50 has a fluted end portion comprising four outwardly projecting ribs or flanges spaced about its periphery with four flutes or recesses formed therebetween. Each half of the fluted end portion on either side of a vertical plane bisecting the fluted end portion and aligning rib 38, is an inverted mirror image of the other half.

Using twelve o'clock and indexing flange 38 as a reference for 'zero' degrees, yellow cartridge 44 (FIG. 4*a*) has a first narrow flange extending circumferentially (i.e., angular width) from 24 to 48 degrees, a second wide flange 52 from 78 to 156 degrees, a third narrow flange just like the first from 204 to 228 degrees, and a fourth wide flange 54 just like the second from 258 to 326 degrees. Similarly, magenta cartridge 46 (FIG. 4*b*) has first moderately wide flange from 24 to 66 degrees, a second wider flange 56 from 96 to 156 degrees, a third flange just like the first from 204 to 246 degrees, and a fourth flange 58 just like the second from 276 to 336 degrees. Cyan cartridge 48 (FIG. 4*c*) has a first wide flange 60 from 24 to 84 degrees, a second narrower flange from 120 to 156 degrees, a third flange 62 just like the first from 204 to 264 degrees, and a fourth flange just like the second from 300 to 336 degrees. Finally, black cartridge 50 (FIG. 2*d*) has a first wide flange 64 from 24 to 102 degrees, a second narrow flange from 132 to 156 degrees, a third flange 66 just like the first from 204 to 282 degrees, and a fourth flange just like the second from 312 to 336 degrees.

Each of the four flutes in each of the above ink cartridges is located between two adjacent flanges and has an angular width corresponding to the angular width of the spacing between such adjacent flanges. Thus, it will be apparent that each side face of each flute defines a plane passing through the axial center of the cartridge.

Figure 5:
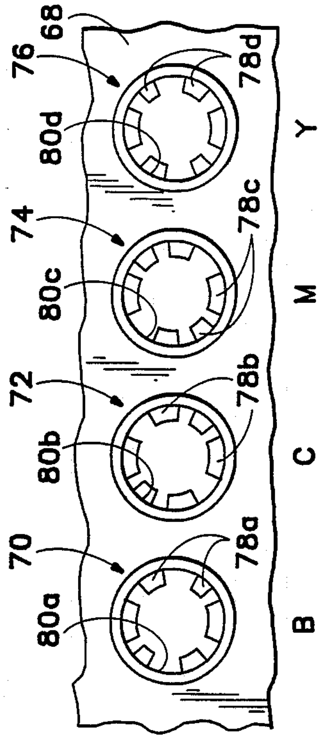
FIG. 5 is a top fragmentary plan view of an ink cartridge receiving portion of a second type of ink jet printer in accordance with the present invention.

FIG. 5 shows a cartridge mounting element 68 in accordance with the present invention. Like mounting element 10, mounting element 68 has four ink cartridge receiving openings 70, 72, 74, 76, each of which overlies reservoir (not shown) and defines a cartridge keying pattern distinctive from the others for seating an ink cartridge containing ink of a particular color. However, unlike element 10, the openings of mounting element 68 each have six ribs or flanges 78*a*, 78*b*, 78*c*, or 78*d* which project inwardly from the peripheral boundary of the opening towards its center and six recesses 80*a*, 80*b*, 80*c*, or 80*d*, each of which is formed between the adjacent ribs.

FIGS. 6*a*, 6*b*, 6*c* and 6*d* show ink cartridges 80, 82, 84, 86, each of which has a unique fluted end portion 88*a*, 88*b*, 88*c*, 88*d*, respectively, adapted to mate precisely with the keying pattern of one of the openings 70, 72, 74 or 76. Each cartridge also has a shoulder 96*a*, 96*b*, 96*c*, or 96*d*, indexing flange 104*a*, 104*b*, 104*c*, or 104*d* and other cartridge components earlier described.

As shown in FIG. 6*a*, the keying pattern of yellow cartridge 80 is identical to that of cartridge 44 (FIG. 4*a*), except that two additional flutes 112, 114 (FIG. 6*a*) are provided which subdivide what was formerly two flanges 52, 54 (FIG. 4*a*) into four flanges 116, 118, 120 and 122 (FIG. 6*a*). The angular orientations of the flanges and flutes are: first flange (24 to 48 degrees); first flute (48 to 78 degrees); second flange (78 to 115 degrees); second flute (115 to 135 degrees); third flange (135 to 156 degrees); third flute (156 to 204 degrees); fourth flange (204 to 228 degrees); fourth flute (228 to 258 degrees); fifth flange (258 to 295 degrees); fifth flute (295 to 315 degrees); sixth flange (315 to 336 degrees); sixth flute (336 to 24 degrees).

Thus, it will be apparent that yellow cartridge 80 can be seated either in yellow cartridge receiving opening 14 (FIG. 1) or opening 68 (FIG. 5), whereas yellow cartridge 44 (FIG. 4*a*) can only be seated in opening 14 of element 10. Cartridge 44 will not seat in opening 68 because opening 68 has two additional flanges 78*a* which act as an occlusion means to prevent its insertion.

Similarly, the keying pattern of magenta cartridge 82 (FIG. 6*b*) is identical to that of cartridge 46 (FIG. 4*b*), except that two additional flutes 124, 126 are provided which subdivide what was formerly flanges 56 and 58 (FIG. 4*b*) into four flanges 128, 130, 132 and 134 (FIG. 6*b*). The angular orientations of the flanges and flutes are: first flange (24 to 66 degrees); first flute (66 to 96 degrees); second flange (96 to 116 degrees); second flute (116 to 141 degrees); third flange (141 to 156 degrees); third flute (156 to 204 degrees); fourth flange (204 to 246 degrees); fourth flute (246 to 276 degrees); fifth flange (276 to 296 degrees); fifth flute (296 to 321 degrees); sixth flange (321 to 336 degrees); sixth flute (336 to 24 degrees).

Thus, magenta cartridge 82 can be seated either in magenta cartridge receiving opening 16 (FIG. 1) or opening 74 (FIG. 5), whereas magenta cartridge 46 (FIG. 4*b*) can only be received in opening 16 of element 10 because opening 74 has two additional flanges 78*c* which act as an occlusion means to prevent its insertion.

The keying pattern of cyan cartridge 84 (FIG. 6*c*) is identical to that of cartridge 48 (FIG. 4*c*), except that cartridge 84 has two additional flutes 136, 138 which subdivide what was formerly flanges 60, 62 (FIG. 4*c*) into four flanges 140, 142, 144 and 146 (FIG. 6*c*). The angular orientations of the flanges and flutes are: first flange (24 to 39 degrees); first flute (39 to 64 degrees); second flange (64 to 84 degrees); second flute (84 to 120 degrees); third flange (120 to 156 degrees); third flute (156 to 204 degrees); fourth flange (204 to 219 degrees); fourth flute (219 to 244 degrees); fifth flange (244 to 264 degrees); fifth flute (264 to 300 degrees); sixth flange (300 to 336 degrees); sixth flute (336 to 24 degrees).

Thus, cyan cartridge 84 can be seated either in opening 18 (FIG. 1) or opening 72 (FIG. 5), whereas cyan cartridge 48 will seat only in opening 18 because opening 72 has two additional ribs 78*b* which act as occlusions to prevent its insertion.

Similarly, the keying pattern of black cartridge 86 (FIG. 6*d*) is identical to that of cartridge 50 (FIG. 4*d*), except that cartridge 86 has two additional flutes 148, 150 which subdivide what was formerly flanges 64 and 66 (FIG. 4*d*) into four flanges 152, 154, 156 and 158 (FIG. 6*d*). The angular orientations of the flanges and flutes are: first flange (24 to 39 degrees); first flute (39 to 59 degrees); second flange (59 to 102 degrees); second flute (102 to 132 degrees); third flange (132 to 156 degrees); third flute (156 to 204 degrees); fourth flange (204 to 220 degrees); fourth flute (220 to 240 degrees); fifth flange (240 to 282 degrees); fifth flute (282 to 312 degrees); sixth flange (312 to 336 degrees); sixth flute (336 to 24 degrees).

Thus, black cartridge 86 can be seated in either opening 20 (FIG. 1) or opening 70 (FIG. 5), whereas its counterpart cartridge 50 can be seated only in opening 20 because opening 70 has two additional ribs 78*a* (FIG. 5) which act as occlusions to prevent its insertion.

It will be apparent that each radially outwardly facing wall of each flute has a common radius of curvature with reference to the axial center of the cartridge. Also, each flange of each cartridge each radially outwardly facing wall or surface of each flange has a larger common radius of curvature with reference to the axial center.

By way of illustration, FIG. 7 shows how prior yellow cartridge 44 (FIG. 4*a*) seats in yellow cartridge receiving opening 14 (FIG. 1). Dashed lines 78*a* represent the locations of the two additional ribs present in yellow cartridge receiving opening 70 and illustrate how such ribs would act as occlusions to prevent insertion of cartridge 44 in opening 70.

FIGS. 8*a*, 8*b*, 8*c* and 8*d* illustrate alternate keying patterns in accordance with the present invention. Such keying patterns and the respective angular orientations of the flanges and flutes are identical to the right bisected halves of the fluted end portions shown in FIGS. 6*a*, 6*b*, 6*c* and 6*d*, respectively. Thus, the keying pattern of FIG. 8*a* for yellow, for example, corresponds to the keying pattern of the right bisected half of FIG. 6*a*. The keying patterns can also be patterned after the left hand bisected halves if desired. As with cartridges 80, 82, 84 and 86, cartridges 180, 182, 184 and 186 have a keying pattern which enables them to seat in the appropriate cartridge receiving opening provided by either element 10 or element 68.

It will be apparent from the foregoing description that one way ink cartridge interchangeability in a four color ink jet printer can be accomplished using certain criteria. For ease of nomenclature, it is assumed that a first series of ink cartridges adapted for use in a first "alternate" ink jet printer are not to be used in a second "primary" ink jet printer, whereas a second series of ink cartridges adapted for use in the primary ink jet printer are to be universally usable in both the alternate and primary ink jet printers.

It is preferred that the four cartridge receiving openings of the alternate printer's cartridge receiving element have at least two ribs defining unique keying patterns to prevent one cartridge from being seated in an opening for the wrong color. The series of four cartridges should each have fluted end portions which are fully complementary to its corresponding cartridge receiving opening.

One way interchangeability can then be provided in the second printer by replicating the keying patterns of the first series of cartridge openings and then additionally providing at least one additional rib which acts as an occlusion to prevent insertion of the first series of cartridges. The second series of cartridges, each having a fluted end portion that is completely complementary to one of the cartridge receiving openings of the second printer, will mate with the appropriate opening in the first printer as well.

The cartridge mounting system of the present invention therefore makes it possible for the second series of cartridges containing a new ink formulation of improved or different character than the first series of cartridges to be used with either the first or second type of ink jet printer, while prior cartridges of the first series are incapable of being used in the second type of ink jet printer.

Having illustrated and described the principles of my invention in a preferred embodiment and variations thereof, it should be apparent to those skilled in the art that the invention may be modified in arrangement and detail without departing from the principles thereof.

I claim:

1. An ink cartridge which can be used interchangeably in either a first type of ink jet printer or a second type of ink jet printer, the first type of ink jet printer having a first cartridge receiving opening with a first peripheral boundary and a first set of four ribs spaced about the first peripheral boundary and projecting inwardly from the first peripheral boundary to define a first keying pattern, the second type of ink jet printer having a second cartridge receiving opening with a second peripheral boundary and a second set of at least five ribs spaced about the second peripheral boundary and projecting inwardly from the second peripheral boundary to define a second keying pattern, the first and second peripheral boundaries being of substantially the same size, the first set of ribs being substantially identical to and positioned at the same relative location about the first boundary as four of the second set of ribs, the cartridge comprising:

a hollow body with an interior ink receiving chamber;

the body having a fluted end portion for insertion into the second cartridge receiving opening, the end portion being sized smaller in cross section than the second cartridge receiving opening to permit insertion therein, the fluted end portion having at least five rib receiving flutes positioned about a periphery of the fluted end portion so as to receive the second set of ribs upon insertion of the fluted end portion into the second cartridge receiving opening, whereby the fluted end portion of the cartridge is also insertable into the first cartridge receiving opening with four of the rib receiving flutes receiving the first set of ribs.

2. An ink cartridge according to claim 1 wherein the second set of ribs comprises a set of six ribs, the fluted end portion having at least six rib receiving flutes positioned about the periphery of the fluted end portion so as to receive the second set of ribs upon insertion of the fluted end portion of the cartridge into the second cartridge receiving opening, the flutes being spaced about the periphery of the fluted end portion by a set of six flanges spaced about the periphery of the end portion and projecting substantially radially outwardly.

3. An ink cartridge for an ink jet printer having a cartridge receiving opening for receiving the cartridge, the cartridge receiving opening having a peripheral boundary, the cartridge comprising:

a body having a hollow interior for containing ink;

the body having an elongated end portion sized smaller in cross section than the cross section of the cartridge receiving opening for insertion into the cartridge receiving opening, the end portion having at least five substantially radially projecting flanges spaced about the periphery of the end portion and a corresponding number of longitudinally extending flutes, each of which is located between two adjacent flanges, the flanges and flutes defining a keying pattern adapted to fit a complementary shaped cartridge receiving opening.

4. An ink cartridge mounting system adapted to provide one-way compatibility between first and second types of ink jet printers, the first type of ink jet printer having a first group of multiple cartridge receiving openings, each cartridge receiving opening having a peripheral boundary, a first set of multiple ribs projecting substantially radially inwardly from the peripheral boundary and a first set of multiple recesses spacing the ribs from one another about the peripheral boundary, the multiple ribs and recesses of each cartridge receiving opening being so configured and arranged as to define a first group of keying patterns which are each distinctive from one another, the keyway pattern of each cartridge receiving opening in the first group being adapted to receive one of a first group of multiple ink cartridges, each cartridge containing a different color of ink and having a complementary shaped end portion adapted to seat in only one of the cartridge receiving openings of the first group, the cartridge mounting system comprising:

- an ink cartridge mounting element supported in the second type of ink jet printer;
- the cartridge mounting element having a second group of multiple cartridge receiving openings;
- each cartridge receiving opening of the second group having a peripheral boundary, a second set of multiple ribs projecting substantially radially inwardly from the peripheral boundary, and a second set of multiple recesses spacing the second set of multiple ribs from one another about the peripheral boundary, the second set of multiple ribs and recesses of each cartridge opening of the second group being so configured and arranged as to define a second group of keying patterns which are distinctive from one another;
- a second group of ink cartridges, each having a hollow body with an interior ink receiving chamber, each hollow body having a fluted end portion, a peripheral boundary, a set of multiple flanges extending substantially radially outwardly and a set of multiple flutes interspaced between the flanges, the set of flanges and flutes of each cartridge of the second group being so configured and arranged as to define keying patterns which are distinctive from one another and complementary to only one of the keying patterns of the cartridge receiving openings of the second group;
- the cartridge receiving openings of the second group having at least one additional recess and one additional rib than the cartridge receiving openings of the first group;
- the keying patterns of the cartridge receiving openings of the second group each matching a different keying pattern of one of the cartridge receiving openings of the first group but for the additional rib and recess;
- whereby each ink cartridge of the second group containing a particular color of ink can be seated in the particular cartridge receiving opening of either the first or second groups designated for such color while the ink cartridges of the first group will not seat in any cartridge receiving opening of the second group.

5. The cartridge mounting system of claim 4 wherein the cartridge receiving openings of the second group each has six spaced apart ribs and six spaced apart recesses and the fluted end portions of the second group of ink cartridges each have six spaced apart flanges and six spaced apart flutes.

6. The cartridge mounting system of claim 5 wherein one of the fluted end portions of the second group of ink cartridges includes a first flange having an angular width extending from about 24 degrees to 48 degrees with reference to a bottom end view of the fluted end portion and to an imaginary zero degree reference line extending radially perpendicularly to an axial centerline of the end portion, a second flange having an angular width extending from about 78 degrees to 115 degrees when similarly viewed, a third flange having an angular width extending from about 135 degrees to 156 degrees when similarly viewed, a fourth flange having an angular width extending from about 204 degrees to 228 degrees when similarly viewed, a fifth flange having an angular width from about 258 degrees to 295 degrees when similarly viewed, and a sixth flange having an angular width from about 315 degrees to 336 degrees when similarly viewed.

7. The cartridge mounting system of claim 5 wherein one of the fluted end portions of the second group of ink cartridges includes a first flange having an angular width extending from about 24 degrees to 66 degrees with reference to a bottom end view of the fluted end portion and to an imaging zero degree reference line extending radially perpendicularly to an axial centerline of the fluted end portion, a second flange having an angular width extending from about 96 degrees to 116 degrees when similarly viewed, a third flange having an angular width extending from about 141 degrees to 156 degrees when similarly viewed, a fourth flange having an angular width extending from about 204 degrees to 246 degrees when similarly viewed, a fifth flange having an angular width from about 276 degrees to 296 degrees when similarly viewed, and a sixth flange having an angular width from about 321 degrees to 336 degrees when similarly viewed.

8. The cartridge mounting system of claim 5 wherein one of the fluted end portions of the second group of ink cartridges includes a first flange having an angular width extending from about 24 degrees to 39 degrees with reference to a bottom end view of the end portion and to an imaging zero degree reference line extending radially perpendicularly to an axial centerline of the end portion, a second flange having an angular width extending from about 64 degrees to 84 degrees when similarly viewed, a third flange having an angular width extending from about 120 degrees to 156 degrees when similarly viewed, a fourth flange having an angular width extending from about 204 degrees to about 219 degrees when similarly viewed, a fifth flange having an angular width from about 244 degrees to 264 degrees when similarly viewed, and a sixth flange having an angular width from about 300 degrees to 336 degrees when similarly viewed.

9. The cartridge mounting system of claim 5 wherein one of the fluted end portions of the second group of ink cartridges includes a first flange having an angular width extending from about 24 to 40 degrees with reference to a bottom end view of the end portion and to an imaging zero degree reference line extending radially perpendicularly to an axial centerline of the end portion, a second flange having an angular width extending from about 66 degrees to 102 degrees when similarly viewed, a third flange having an angular width extending from about 132 degrees to 156 degrees when similarly viewed, a fourth flange having an angular width extending from about 204 degrees to 220 degrees when similarly viewed, a fifth flange having an angular width from about 240 degrees to 282 degrees when similarly viewed, and a sixth flange having an angular width from about 312 degrees to 336 degrees when similarly viewed.

10. An ink cartridge system adapted for use in an ink jet printer, the system comprising:

- at least four ink cartridges each having a substantially cylindrical hollow body defining an interior ink receiving chamber and a fluted end portion;
- each fluted end portion having an outer periphery, at least six flanges projecting radially outwardly from the periphery and six flutes spacing the flanges from one another, the flanges and flutes of each ink cartridge defining a unique keying pattern distinctive from the others;

the fluted end portion of a first ink cartridge including a first flange having an angular width extending from about 24 degrees to 48 degrees with reference to a bottom end view of the fluted end portion and to an imaginary zero degree reference line extending radially perpendicularly to an axial centerline of the end portion, a second flange having an angular width extending from about 78 degrees to 115 degrees when similarly viewed, a third flange having an angular width extending from about 135 degrees to 156 degrees when similarly viewed, a fourth flange having an angular width extending from about 204 degrees to 228 degrees when similarly viewed, a fifth flange having an angular width from about 258 degrees to 295 degrees when similarly viewed, and a sixth flange having an angular width from about 315 degrees to 336 degrees when similarly viewed;

the fluted end portion of a second ink cartridge including a first flange having an angular width extending from about 24 degrees to 66 degrees with reference to a bottom end view of the fluted end portion and to an imaging zero degree reference line extending radially perpendicularly to an axial centerline of the fluted end portion, a second flange having an angular width extending from about 96 degrees to 116 degrees when similarly viewed, a third flange having an angular width extending from about 141 degrees to 156 degrees when similarly viewed, a fourth flange having an angular width extending from about 204 degrees to 246 degrees when similarly viewed, a fifth flange having an angular width from about 276 degrees to 29 degrees when similarly viewed, and a sixth flange having an angular width from about 321 degrees to 336 degrees when similarly viewed;

the flange end portion of a third ink cartridge including a first flange having an angular width extending from about 24 degrees to 39 degrees with reference to a bottom end view of the end portion and to an imaging zero degree reference line extending radially perpendicularly to an axial centerline of the end portion, a second flange having an angular width extending from about 64 degrees to 84 degrees when similarly viewed, a third flange having an angular width extending from about 120 degrees to 156 degrees when similarly viewed, a fourth flange having an angular width extending from about 204 degrees to about 219 degrees when similarly viewed, a fifth flange having an angular width from about 244 degrees to 264 degrees when similarly viewed, and a sixth flange having an angular width from about 300 degrees to 336 degrees when similarly viewed;

the flange end portion of a fourth ink cartridge including a first flange having an angular width extending from about 24 to 40 degrees with reference to a bottom end view of the end portion and to an imaging zero degree reference line extending radially perpendicularly to an axial centerline of the end portion, a second flange having an angular width extending from about 66 degrees to 102 degrees when similarly viewed, a third flange having an angular width extending from about 132 degrees to 156 degrees when similarly viewed, a fourth flange having an angular width extending from about 204 degrees to 220 degrees when similarly viewed, a fifth flange having an angular width from about 240 degrees to 282 degrees when similarly viewed, and a sixth flange having an angular width from about 312 degrees to 336 degrees when similarly viewed.

* * * * *

UNITED STATES PATENT AND TRADEMARK OFFICE

CERTIFICATE OF CORRECTION

PATENT NO. : 4,907,019

DATED : March 6, 1990

INVENTOR(S) : Rodney M. Stephens

It is certified that error appears in the above-identified patent and that said Letters Patent is hereby corrected as shown below:

Col. 11, line 38, "29" should read "296"

Signed and Sealed this

Fifth Day of May, 1992

*Attest:*

DOUGLAS B. COMER

*Attesting Officer* — *Acting Commissioner of Patents and Trademarks*